O. A. AND W. T. HUCKABEE.
TRACTOR.
APPLICATION FILED JAN. 15, 1920.
1,363,978.
Patented Dec. 28, 1920.
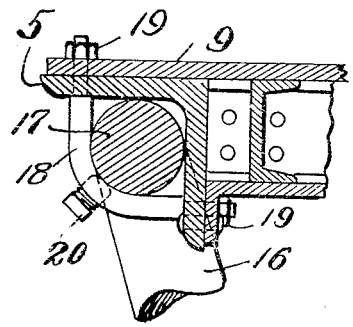
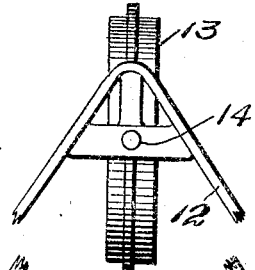
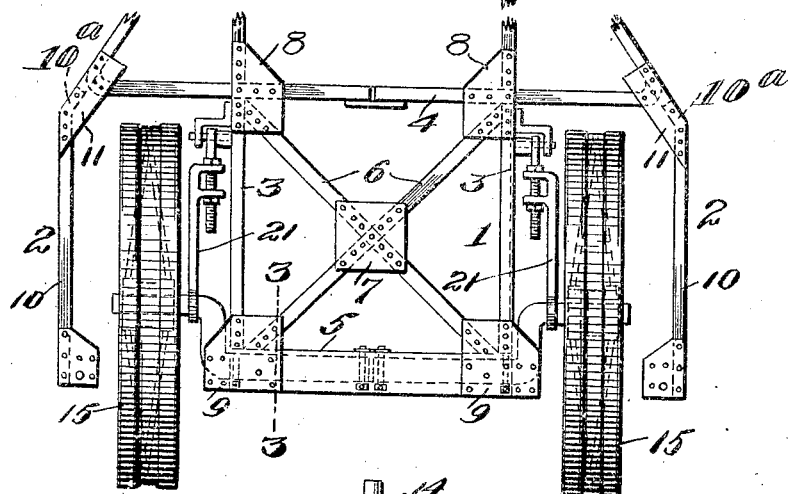
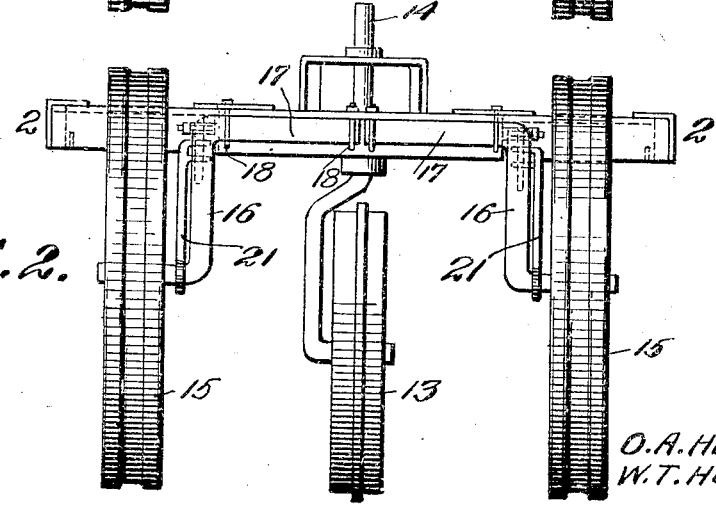
Inventors
O. A. Huckabee.
W. T. Huckabee.
Their Attorneys

UNITED STATES PATENT OFFICE.

OTIS A. HUCKABEE AND WILLIAM T. HUCKABEE, OF TEXARKANA, ARKANSAS.

TRACTOR.

1,363,978.  Specification of Letters Patent.  Patented Dec. 28, 1920.

Original application No. 281,349, filed March 8, 1919. Divided and this application filed January 15, 1920. Serial No. 351,723.

*To all whom it may concern:*

Be it known that we, OTIS A. and WILLIAM T. HUCKABEE, citizens of the United States, residing at Texarkana, in the county of Miller and State of Arkansas, have invented certain new and useful Improvements in Tractors, of which the following is a specification, reference being had therein to the accompanying drawings.

This invention relates to a tractor frame and carriage, and has for its object the construction of an apparatus which is efficient and durable for the purpose of plowing or breaking of ground in agricultural pursuits.

Another object of the invention is the construction of an apparatus which has its supporting wheels detachably secured to the rear end of the frame, and which wheels are positioned outside of said frame.

This application is a divisional case from our original application, Serial No. 281,349, relating to a tractor frame and carriage.

With the foregoing objects in view, our invention comprises certain novel combinations, arrangements, and constructions of parts as will be hereinafter fully described, illustrated in the accompanying drawings, and more particularly pointed out in the appended claims.

In the drawings:

Figure 1 is a top plan view of the apparatus constructed in accordance with the present invention and adapted to plowing or "breaking" purposes.

Fig. 2 is a rear view of our apparatus.

Figure 3 is a sectional view taken on line 3—3, Fig. 1.

Referring to the drawings by reference numerals, 1 designates the frame, and 2 designates the lateral extensions on both sides thereof.

The frame 1 is made up of side bars 3, a front sectional bar 4, and a rear angle bar 5. Cross bars 6 brace the sides and ends of the frame, and at the central portion of bars 6 is a central bracing plate 7. Front bracing plates 8 are secured to the inner corners of the frame, and rear bracing plates 9 are secured to the rear corners of the frame.

The lateral extensions 2 comprise outer side pieces 10, which are connected, at their inner ends, to connecting plates 11. Each side piece 10 is provided with an inner angularly-disposed portion 10ª.

The front sectional bar 4 extends across side bars 3 and terminates at its outer ends in the substantially V-shaped piece or bar 12.

A guiding wheel 13 is suitably journaled upon a vertical shaft 14, which shaft 14 extends through a part of the front of the substantially V-shaped frame constituted by the bar 12. We provide two supporting wheels 15 journaled upon crank axles 16. The upper, inner ends 17, of the axles 16, are mounted in angle bolt brackets 18 (Fig. 3). The inner ends 17 of the crank axles are positioned under the rear angle bar 5 and two of the brackets 18 are employed to secure the inner end 17 of each crank axle 16 to the frame 1. Each bracket 18 is provided with nuts 19 upon its ends for fastening the bracket in place. A locking bolt 20 is threaded unto each bracket 18 and its inner end engages the inner end of the crank axle for preventing longitudinal movement or accidental displacement of the axle off its brackets 18.

A pair of detachable and adjustable bracing devices 21 are employed for bracing and holding axles 16 in their fixed assembled position outside of the frame 1 and within the lateral extensions 2.

Further reference to the adaptability and advantages of our apparatus may be had upon referring to our co-pending application, Serial No. 281,349 hereinbefore referred to.

What we claim is:

1. In an apparatus of the class described, the combination of a frame, said frame at its rear end provided with a rear angle bar, a pair of axles placed under said rear bar, fastening means extending through portions of the angle bar and detachably securing the axles thereto, and supporting wheels journaled upon said axles outside of said frame and contiguous to the sides thereof.

2. In an apparatus of the class described, the combination of a frame, provided with a rear angle structure, axles having their outer ends positioned at the sides of the frame and having their inner ends positioned within the angle structure of the frame, brackets securing the inner ends of the axles to said angle structure of the frame, means bracing the outer ends of the axles, and supporting wheels journaled upon the outer ends of the axles.

3. In an apparatus of the class described, the combination of a frame provided at its rear end with a transversely-positioned angle bar, said bar provided with a horizontal and a vertical portion, a plurality of angle brackets having their ends extending through the horizontal and vertical portions of the angle bar, a locking bolt threaded through each angle bracket, a pair of axles placed between the angle brackets and the horizontal and vertical portions of the angle bar, said locking bolts adapted to engage at their inner ends the axles and prevent rotary movement of the axles within the brackets, and supporting wheels journaled upon the axles.

In testimony whereof we hereunto affix our signatures.

OTIS A. HUCKABEE.
WILLIAM T. HUCKABEE.